April 27, 1926.

L. C. VAUGHN 1,582,708

BATTERY CHARGING SYSTEM

Filed March 30, 1921

WITNESSES:
A. G. Schiefelbein
H. Keith

INVENTOR
Lewis C. Vaughn.
BY
Wesley G. Carr,
ATTORNEY

Patented Apr. 27, 1926.

1,582,708

UNITED STATES PATENT OFFICE.

LEWIS C. VAUGHN, OF WILKINSBURG, PENNSYLVANIA, ASSIGNOR TO WESTINGHOUSE ELECTRIC & MANUFACTURING COMPANY, A CORPORATION OF PENNSYLVANIA.

BATTERY-CHARGING SYSTEM.

Application filed March 30, 1921. Serial No. 456,878.

*To all whom it may concern:*

Be it known that I, LEWIS C. VAUGHN, a citizen of the United States, and a resident of Wilkinsburg, in the county of Allegheny and State of Pennsylvania, have invented a new and useful Improvement in Battery-Charging Systems, of which the following is a specification.

My invention relates to means for charging storage batteries and it has particular relation to the charging of batteries employed on automobiles and the like.

An object of my invention is to provide a system whereby a number of batteries may be charged simultaneously and each battery disconnected independently as its charge is completed.

Another object of my invention is to prevent the batteries from discharging if the source of energy fails.

Other objects of my invention will be more clearly brought out in the following specification.

It has been the practice, in charging batteries of the kind designated, to provide a separate charging unit for each battery. In some instances, a number of batteries are charged automatically and successively from a single source of energy.

In accordance with my invention, I propose to connect a plurality of batteries to a source of energy and to employ suitable means for automatically controlling the charging of each battery. I propose to employ a suitable direct current source of energy, and a plurality of circuits for simultaneously supplying energy to batteries connected thereto. The circuits comprise suitable means for limiting the current delivered to each battery, a circuit controlling device for regulating the time of charging each battery, means for insuring that the batteries are connected properly with regard to polarity, and devices operative upon failure of the source of energy for disconnecting the batteries.

My invention will be described in connection with the accompanying drawings in which—

Figure 1:
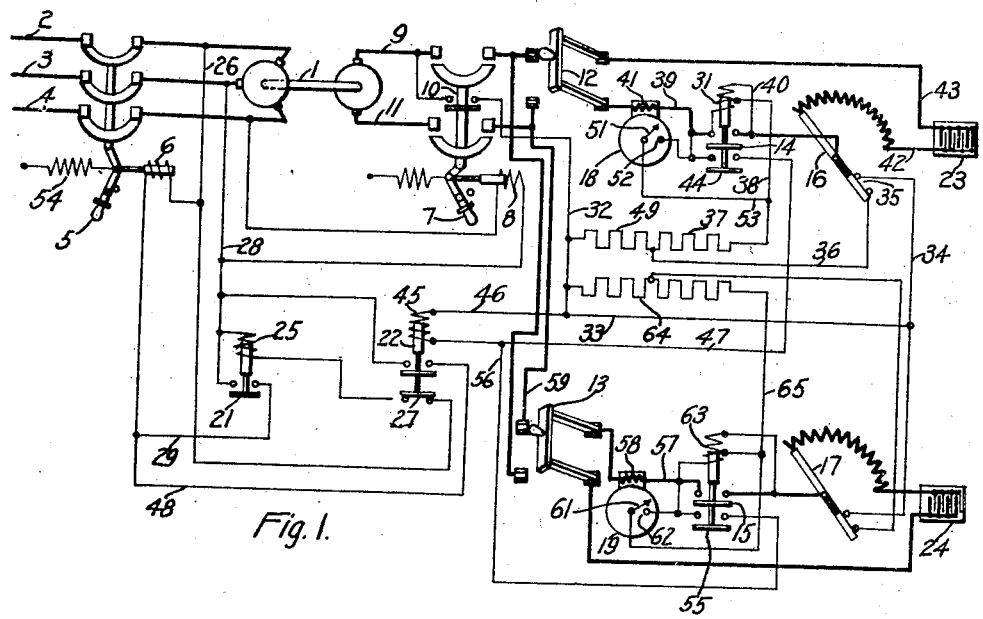
Figure 1 is a diagrammatic view of circuits and apparatus embodying my invention.

Referring particularly to Fig. 1, energy for driving a motor-generator set 1 is obtained from line conductors 2, 3 and 4 which are connected to a source of alternating current. An alternating current circuit breaker 5, having a low voltage coil 6, controls the operation of the motor-generator set. A circuit breaker 7, having a low voltage coil 8, controls the direct current energy supplied to conductors 9 and 11 by the motor generator set 1. An interlock 10 is attached to and operated by the circuit breaker 7. Knife switches 12 and 13 control the battery charging circuits completed by line contactors 14 and 15. Rheostats 16 and 17 regulate the current supplied to each battery. Ampere-hour meters 18 and 19 are arranged to interrupt the respective charging circuits as the batteries become charged.

Relays 21 and 22 control the circuit breaker 5. Storage-batteries 23 and 24 to be charged are connected, as shown. For simplicity, I have shown a plurality of circuits comprising only two batteries. It is evident, from the diagram, that any desired number of parallel circuits for other batteries may be added.

Assuming the normal connections and relations of apparatus to be as shown in Fig. 1, and assuming that circuit breaker 5 has been closed, a circuit is established for the coil 25 of relay 21, extending from line conductor 2 through circuit breaker 5, conductor 26, interlock 27, coil 25, conductor 28 and circuit breaker 5 to line conductor 3. Relay 21 closes, establishing a holding circuit for the circuit breaker 5, comprising its low voltage coil 6, and extending from line conductor 2 through circuit breaker 5, conductor 26, coil 6, conductor 29, relay 21, conductor 28, and circuit breaker 5 to line conductor 3.

Circuit breaker 7 is next closed. Its holding coil 8 is energized from line conductors 3 and 4 through the circuit breaker 5. Assuming the motor generator set 1 to be now in operation, the closure of knife switch 12 establishes a circuit for coil 31 of contactor 14, extending from conductor 9 through interlock 10, conductors 32, 33 and 34, interlock 35 which is normally closed when the rheostat 16 is all "in", conductor 36, resistor section 37, conductor 38, lower section of coil 31, conductor 39, meter coil 41, knife switch 12 and circuit breaker 7 to the conductor 11. Contactor 14 closes if the battery 23 is properly connected with respect to polarity.

If the battery connections are reversed, in which case the battery would be discharged instead of charged, a circuit is established for the section of coil 31 employing energy from the battery, which opposes the energization of that section of coil 31 previously traced. Therefore, contactor 14 is prevented from closing. A circuit for the opposing coil extends from the battery 23 through conductor 43, knife switch 12, circuit breaker 7, interlock 10, conductors 32, 33 and 34, interlock 35, conductor 36, resistor section 37, conductor 38 and the top section of coil 31, conductor 40, rheostat 16 and conductor 42 to the battery 23.

Assuming that the battery 23 has been connected in correct relation, contactor 14 is closed by its actuating coil 31, establishing a charging circuit which extends from conductor 9 through circuit breaker 7, knife switch 12, conductor 43, battery 23, conductor 42, rheostat 16, contactor 14, conductor 39, meter coil 41, knife switch 12 and circuit breaker 7 to the conductor 11.

An interlock 44 is connected to contactor 14 and, upon the closure of contactor 14, a circuit is established for coil 45 of relay 22, extending from conductor 9 through interlock 10, conductors 32 and 46, coil 45, conductor 47, interlock 44, conductor 39, meter coil 41, knife switch 12 and circuit breaker 7 to conductor 11. Relay 22 closes to establish a holding circuit for the low voltage coil 6 of the circuit breaker 5, extending from conductor 2 through circuit breaker 5, conductor 26, coil 6, conductor 48, relay 22, conductor 28 and circuit breaker 5 to conductor 3. The interlock 27 is attached to the relay 22 and is actuated upon the closure of relay 22 to interrupt a circuit for the coil 25 of relay 21, previously traced.

With the rheostat 16 entirely in circuit, a circuit, comprising the interlock 35, is established, as previously traced. It will be noted that interlock 35 shunts a resistor section 49. When it is desirable to shunt out a portion of the resistance of rheostat 16 after the battery charging process has begun, the movement of the rheostat arm disengages the interlock 35 and a holding circuit for the coil 31 of contactor 14 is established, comprising the resistor sections 49 and 37. The ohmic value of resistor 49 is such as to prevent the closure of contactor 14 but permits the flow of sufficient current to maintain a holding circuit for contactor 14 after it has closed. The evident function of resistor section 49 then is to prevent the closure of contactor 14 unless the arm of rheostat 16 occupies a predetermined position.

As the battery 23 is charged, the movable contact 51 of the ampere-hour meter 18 rotates in a clockwise direction until it engages stationary contact member 52, establishing a shunt circuit for the operating coil 31 of the contactor 14, extending from conductor 9 through interlock 10, conductor 32, resistor sections 49 and 37, conductor 53, contact members 51 and 52, conductor 39, meter coil 41, knife switch 12 and circuit breaker 7 to the conductor 11. Contactor 14 opens to interrupt the charging circuit for battery 23. The interlock 44 opens to interrupt the circuit previously traced for coil 45 of relay 22.

An interlock 55, attached to contactor 15, establishes a circuit for coil 45 of the relay 22, which is independent of the circuit established by interlock 44 of contactor 14. This independent circuit extends from conductor 9 through interlock 10, conductors 32 and 46, coil 45, conductor 56, interlock 55, conductor 57, meter coil 58, knife switch 13, conductor 59 and circuit breaker 7 to the conductor 11.

When the battery 24 is charging, contact 61 of meter 19 rotates in a clockwise direction to engage stationary contact member 62. A holding circuit for coil 63 of contact 15, similar to that of contactor 14, extends from conductor 9 through interlock 10, conductor 32, resistor 64, conductor 65, lower section of coil 63, conductor 57, meter coil 58, knife switch 13, conductor 59 and circuit breaker 7 to conductor 11. The engagement of contact members 61 and 62 establishes a shunt circuit for coil 63 extending from conductor 9 through interlock 10, conductor 32, resistor 64, conductor 65, contact members 61 and 62, conductor 57, meter coil 58, knife switch 13, conductor 59 and circuit breaker 7 to conductor 11. Contactor 15 now opens, interrupting the charging circuit for battery 24.

Assuming that contactor 14 has already been opened to disconnect battery 23, the interlock 55, upon the opening of contactor 15, interrupts a circuit for coil 45 of relay 22. Relay 22 opens to interrupt the holding circuit previously traced for coil 6 of the circuit breaker 5. When coil 6 is de-energized, a spring 54 effects the opening of circuit breaker 5. The failure of voltage, effected by the opening of circuit breaker 5, causes the motor-generator set 1 to come to rest, and holding coil 8 is de-energized to effect the opening of circuit breaker 7.

On failure of the energy in conductors 2, 3 and 4, low voltage coils 6 and 8 of circuit breakers 5 and 7, respectively, are de-energized, interrupting the battery charging circuits and opening contactors 14 and 15 to prevent the batteries from discharging through the generator or from one battery into another. Upon return of power it is necessary to start the charging operation in the sequence previously described, beginning with the closure of circuit breaker 5.

Figure 2:
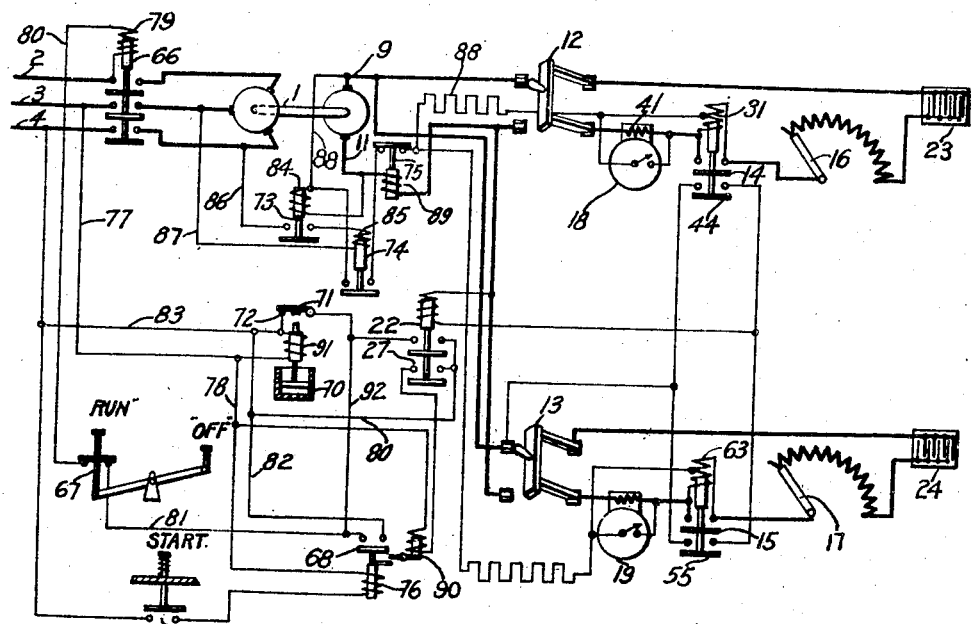
Fig. 2 is a modification of the system shown in Fig. 1.

Reference may now be had to Fig. 2, in which the embodiment of my invention is illustrated, similar numerals being employed to designate corresponding parts. In Fig. 2, however, I employ an automatic starter 66 of simple form in place of a circuit breaker for connecting the motor-generator set 1 with line conductors 2, 3 and 4. Any suitable type of starter may be employed which is capable of being remotely controlled. A push button switch 67 of well known construction is biased in either of two positions, one of which establishes a "running" position and the other an "off" position of the starter 66. A relay 68 is initially controlled by a push-button switch 69 and is provided with a holding latch and a reset magnet, similar in operation to the well known mechanism of an overload relay. A time-limit relay 70 is normally energized by the alternating current source of energy to disengage its contact members 71 and 72. A relay 73 is energized in accordance with the voltage of the direct current generator, preventing the batteries from being connected before the generator voltage is of sufficiently high value to resume charging, thus preventing a reversal of current from the batteries through the generator. A relay 74 is energized upon the closure of the relay 73 to complete the circuits of coils 31 and 63, respectively, of contactors 14 and 15. An overload relay 75 of a known type controls the contactors 14 and 15.

Assuming the apparatus positioned as shown diagrammatically in Fig. 2, with batteries 23 and 24 connected for charging, we may actuate push button switch 69, establishing a circuit for coil 76 of relay 68 extending from line conductor 3 through conductors 77 and 78, coil 76 and push-button switch 69 to line conductor 4. Relay 68 closes and latches itself in closed position. A circuit for coil 79 of the automatic starter 66 extends from conductor 2 through coil 79, conductor 80, push button switch 67, conductor 81, relay 68, and conductors 82 and 83 to conductor 4. Motor-generator 1 will start upon closure of auto-starters 66, and relay 73, having a coil 84 controlled in accordance with the generator voltage, will close at a predetermined value of voltage, establishing a circuit for the coil 85 of relay 74, extending from conductor 4, through automatic starter 66, conductor 86, relay 73, coil 85, conductor 87 and automatic starter 66 to the conductor 3. The closure of relay 74 and knife-switch 12 establishes a circuit extending from conductor 9 through relay 74, relay 75, resistor 88, lower section of coil 31, meter coil 41, knife-switch 12 and overload relay coil 89 to conductor 11. Contactor 14 and relay 22 now close, as in Fig. 1, and interlock 27 actuates the reset-magnet 90 to restore relay 68 to its normal position.

Similarly, coil 63 of contactor 15 is energized by a circuit extending from conductor 9, through relays 74 and 75 through coil 63 and back to conductor 11. As batteries 23 and 24 are charged, they are controlled as described in connection with Fig. 1. Coil 91 of relay 70 is normally energized from line conductors 3 and 4 to disengage contact members 71 and 72.

Upon failure of the source of energy, relay coil 91 is de-energized and contact members 71 and 72 close. Upon return of power, a circuit is established for the coil 79 of the automatic starter 66 extending from line conductor 4, through conductor 83, contact members 72 and 71, conductors 92 and 81, push-button switch 67, conductor 80 and coil 79 to line conductor 2. The motor-generator set is, therefore, automatically restarted independently of push-button 69. Relay 70, which is energized upon return of power, is actuated by coil 91 to again disengage contact members 71 and 72. The action of relay 70, however, is retarded by a dashpot, as shown, so that contact members 71 and 72 are not disengaged until a holding circuit is established for coil 79 of the automatic starter, extending from line conductor 2 through coil 79, conductor 80, push-button switch 67, conductors 81 and 92, relay 22, and conductors 80 and 83 to conductor 4. In other respects, the operation of the system of Fig. 2 is similar to that of Fig. 1.

I have described systems in which a plurality of batteries may be charged simultaneously and automatically disconnected from the charging circuits when fully charged, and in which the batteries are fully protected against discharge caused by power failure or by improper connection with regard to polarity. After failure of power, charging is automatically resumed when power returns, as described and illustrated in Fig. 2. I have shown a motor-generator set operated by an alternating current source of energy, but any suitable unidirectional current supply may be employed for charging the batteries.

Any suitable automatic starting device may be employed for operating the motor-generator as conditions may demand.

I claim as my invention:—

1. The combination with a source of energy and a plurality of similarly connected storage batteries, of circuit controlling means for each of said batteries, means for controlling said circuit controlling means and for limiting the initial current supply, automatic means for interrupting the source of energy when all of said batteries are charged, and means for automatically disconnecting said batteries if said source of energy fails and for preventing a discharge from one to another battery.

2. The combination with a source of energy and a plurality of similarly connected storage batteries, of circuit controlling means therfor, means for positively limiting the current supplied to each battery and for controlling said circuit controlling means, automatic means for interrupting the source of energy when all the batteries are charged, and automatic means for preventing the discharge of one battery through another upon failure of said source of energy.

3. The combination with an alternating current circuit and means for rectifying the current, of a circuit controlling device in said circuit, a low voltage magnet for said device, a relay for controlling the low voltage magnet, a circuit controlling device for said rectified current, and means controlled by the last named circuit controlling device for independently controlling said low voltage magnet.

4. The combination with an alternating current circuit and means for rectifying the current, of a circuit controlling device in said circuit, a low voltage magnet for said device, a relay for controlling the low voltage magnet, a circuit controlling device for said rectified current, a storage battery to be charged, means controlled by the last named circuit controlling device for independently controlling said low voltage magnet, and a circuit controlling device for automatically disconnecting said battery if the alternating current circuit fails.

5. The combination with an alternating current source of energy and means for rectifying the energy, of a plurality of storage batteries, means for translating energy for simultaneously charging the batteries, means for successively interrupting the circuits of the several translating means as the batteries become charged, means for automatically disconnecting said batteries if the alternating current energy fails, and means for automatically restoring the normal connections when said alternating current energy is restored.

6. The combination with a source of energy and a plurality of storage batteries, of means for translating energy for simultaneously charging the batteries, a push-button switch for controlling said translating means, automatic means for successively disconnecting said batteries as they are charged, means for automatically disconnecting said batteries if the source of energy fails and for automatically restoring the normal connections when said energy is restored, and means for preventing said restoration until the voltage of said source of energy is of a predetermined value.

In testimony whereof, I have hereunto subscribed by name this 23rd day of March, 1921.

LEWIS C. VAUGHN.